(12) United States Patent
Fahmi et al.

(10) Patent No.: US 12,366,554 B2
(45) Date of Patent: Jul. 22, 2025

(54) GASEOUS BUBBLE SYSTEM AND METHOD TO MEASURE GELATION TIME

(71) Applicant: Saudi Arabian Oil Company, Dhahran (SA)

(72) Inventors: Mohanad M. Fahmi, Al Khobar (SA); Abdulkareem AlSofi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 373 days.

(21) Appl. No.: 17/475,604

(22) Filed: Sep. 15, 2021

(65) Prior Publication Data

US 2023/0080236 A1 Mar. 16, 2023

(51) Int. Cl.
*G01N 29/02* (2006.01)
*G01K 13/00* (2021.01)
*G01N 1/44* (2006.01)
*G01N 27/04* (2006.01)

(52) U.S. Cl.
CPC ............ *G01N 29/02* (2013.01); *G01K 13/00* (2013.01); *G01N 1/44* (2013.01); *G01N 27/04* (2013.01); *G01N 2291/02433* (2013.01)

(58) Field of Classification Search
CPC .......... G01N 29/02; G01N 1/44; G01N 27/04; G01N 2291/02433; G01N 29/348; G01K 13/00

See application file for complete search history.

(56) References Cited

U.S. PATENT DOCUMENTS

| 3,658,638 | A | * | 4/1972 | Ludwig | C09J 197/00 |
| | | | | | 156/335 |
| 4,274,283 | A | | 6/1981 | Maus et al. | |
| 4,688,938 | A | | 8/1987 | Demoulin et al. | |

(Continued)

FOREIGN PATENT DOCUMENTS

| CN | 114924322 A | * | 8/2022 | | |
| EP | 0474284 | | 3/1992 | | |
| EP | 1029230 | | 8/2000 | | |
| GB | 191022961 | | 12/1910 | | |
| GB | 2262117 | | 6/1993 | | |
| GB | 2355640 A | * | 5/2001 | ............... | A01K 5/01 |

(Continued)

OTHER PUBLICATIONS

Scientific article on Gelation from Scientific Direct (Year: 2023).*

(Continued)

*Primary Examiner* — Son T Le
*Assistant Examiner* — Matthew W. Baca
(74) *Attorney, Agent, or Firm* — Fish & Richardson P.C.

(57) ABSTRACT

A method and a system to determine a gelation time of a substance in a container is disclosed. The system includes a container, a bubble generator arranged at a first end of the container, and a bubble sensor arranged at the second end of the container. The container holds a substance having a surface adjacent the second end. The bubble generator is configured to generate a bubble at the first end. The bubble sensor is configured to sense the bubble at the surface of the substance. The method includes releasing a gas into a first end of the container such that the gas bubbles rise from the first end of the container to a second end of the container, sensing the released bubbles, determining an absence of a bubble released by the bubble generator at the bubble sensor, and determining a gelation time based on a number of detected bubbles.

27 Claims, 5 Drawing Sheets

(56) References Cited

U.S. PATENT DOCUMENTS

| | | | |
|---|---|---|---|
| 4,691,558 A * | 9/1987 | Vinson | E21B 49/005 |
| | | | 73/64.41 |
| 4,719,423 A | 1/1988 | Vinegar et al. | |
| 4,979,390 A | 12/1990 | Schupack et al. | |
| 5,101,903 A | 4/1992 | Llave et al. | |
| 5,167,144 A * | 12/1992 | Schneider | G01N 9/28 |
| | | | 73/61.41 |
| 5,289,716 A | 3/1994 | Schumacher | |
| 5,387,865 A | 2/1995 | Jerosch-Herold et al. | |
| 5,507,178 A | 4/1996 | Dam | |
| 5,861,946 A | 1/1999 | Hudson et al. | |
| 6,982,787 B1 | 1/2006 | Wapner et al. | |
| 7,010,962 B2 | 3/2006 | Sinha | |
| 8,474,306 B1 | 7/2013 | Behroozi | |
| 8,768,628 B2 | 7/2014 | Ghedan et al. | |
| 9,016,111 B2 | 4/2015 | Stukan et al. | |
| 9,086,354 B2 | 7/2015 | AlSahan et al. | |
| 9,581,527 B2 | 2/2017 | Leck | |
| 9,675,994 B2 | 6/2017 | Schoenfisch | |
| 10,718,702 B2 | 7/2020 | Alshehri et al. | |
| 10,794,807 B2 | 10/2020 | AlGeer | |
| 10,908,063 B2 | 2/2021 | Gmira et al. | |
| 2004/0144175 A1* | 7/2004 | Sinha | G01N 29/036 |
| | | | 73/579 |
| 2005/0212869 A1 | 9/2005 | Ellson | |
| 2010/0100339 A1* | 4/2010 | Juergensen | G01L 19/16 |
| | | | 702/50 |
| 2010/0234252 A1 | 9/2010 | Moradi-Araghi et al. | |
| 2012/0055264 A1* | 3/2012 | Sinha | G01F 1/74 |
| | | | 73/861.25 |
| 2012/0181019 A1 | 7/2012 | Saini et al. | |
| 2012/0273193 A1 | 11/2012 | Sen et al. | |
| 2013/0152668 A1 | 6/2013 | Stukan et al. | |
| 2014/0144628 A1 | 5/2014 | Moradi-Araghi et al. | |
| 2014/0147627 A1 | 5/2014 | Aizenberg | |
| 2014/0147631 A1 | 5/2014 | Yang | |
| 2015/0086451 A1 | 3/2015 | Torem et al. | |
| 2015/0211973 A1 | 7/2015 | Friedrich et al. | |
| 2015/0233223 A1 | 8/2015 | AlAmeri et al. | |
| 2015/0259754 A1 | 9/2015 | Kaler | |
| 2016/0272873 A1 | 9/2016 | Mahadevan et al. | |
| 2016/0305922 A1 | 10/2016 | Narang et al. | |
| 2016/0339424 A1 | 11/2016 | Megaridis | |
| 2017/0028330 A1 | 2/2017 | Dawar | |
| 2017/0030819 A1 | 2/2017 | McCarty | |
| 2017/0285122 A1 | 10/2017 | Kaditz et al. | |
| 2019/0078985 A1* | 3/2019 | Albrecht | G01N 1/30 |
| 2019/0094120 A1 | 3/2019 | Gmira et al. | |
| 2019/0242803 A1 | 8/2019 | AlGeer et al. | |
| 2019/0242804 A1 | 8/2019 | Alshehri | |
| 2020/0060931 A1* | 2/2020 | Carrico | B65D 25/04 |
| 2020/0149813 A1 | 5/2020 | Sabarez et al. | |
| 2020/0371010 A1 | 11/2020 | Gmira et al. | |
| 2021/0069708 A1* | 3/2021 | Govyadinov | G01F 1/708 |
| 2023/0362524 A1* | 11/2023 | Yuan | G01N 29/036 |

FOREIGN PATENT DOCUMENTS

| | | |
|---|---|---|
| JP | 4563890 | 10/2010 |
| JP | 2015044133 A * | 3/2015 |
| JP | 2017037080 | 2/2017 |
| WO | WO 2010105070 | 9/2010 |
| WO | WO 2012140338 | 10/2012 |
| WO | WO 2014082001 | 5/2014 |
| WO | WO 2019231479 | 12/2019 |

OTHER PUBLICATIONS

Al-Muntasheri et al., "Gelation Kinetics and Performance Evaluation of an Organically Crosslinked Gel at High Temperature and Pressure," SPE Journal, Sep. 2008, 337-345, 8 pages.

Al-Muntasheri et al., "Viscoelastic properties of a high temperature cross-linked water shut-off polymeric gel," Journal of Petroleum Science and Engineering, Apr. 2006, 55:56-66, 10 pages.

Alshakhs et al., "Understanding the role of brine ionic composition on oil recovery by assessment of wettability from colloidal forces," Advances in Colloid and Interface Science, Elsevier, vol. 233, Aug. 20, 2015, 13 pages.

Alshakhs, "An Experimental Study of the Impact of Injection Water Composition on Oil Recovery from Carbonate Rocks," A Dissertation Submitted to the Department of Energy Resources Engineering and the Committee on Graduate Studies of Stanford University in Partial Fulfillment of the Requirements for the Degree of Doctor of Philosophy, Jun. 2015, 171 pages.

Alshehri, "An X-Ray CT Study of Multidimensional Imbibition in Dual Porosity Carbonates," A Dissertation submitted to the Department of Energy Resources Engineering and the Committee on Graduate Studies of Stanford University in Partial Fulfillment of the Requirements for the Degree of Doctor of Philosophy, Oct. 2013, 434 pages.

Attension, "Static and dynamic contact angles and their measurement techniques," Biolin Scientific, available on or before Aug. 2017, 3 pages.

Bryant et al., "Influence of Syneresis on Permeability Reduction by Polymer Gels," Society of Petroleum Engineers, Jun. 1, 2008, 7 pages.

Chang et al., "Effective Porosity, Producible Fluid and Permeability in Carbonate from Nmr Logging," Society of Petrophysicists and Well-Log Analysts, presented at the SPWLA 35th Annual Logging Symposium, Jun. 19-22, 1994, Abstract, 2 pages.

Chen et al., "Pore-Connectivity Based Permeability Model for Complex Carbonate Formations," Society of Petrophysicists, Jan. 2008, 11 pages.

Dahan, "Etude De l'ascension De Bulles De Gaz Dans Un Liquide Visqueux Stabilite et Vitesse," Etude Bibliographique, Jul. 1969, English Abstract only, 58 pages.

Detsch, "Small Air Bubbles in Reagent Grade Water and Seawater: 1. Rise Velocities of 20- to 1000-Mm-Diameter Bubbles," Journal of Geophysical Research, Oceans, an AGU Journal, May 15, 1991, 96:C5 (8901-8906), 6 pages.

Diacomo et al., "Mechanism of Polyacrylamide Gel Syneresis Determined by C-13 NMR," SPE 11787 International Symposium on Oilfield and Geothermal Chemistry, Denver, CO, Jun. 1-3, 1983; Society of Petroleum Engineers, Inc., 1983, 8 pages.

Dyne Testing, "Contact Angle Measurement Equipment," Dyne Testing Ltd, available on or before Dec. 26, 2016, 2 pages.

Extrand and Yumagai, "An experimental study of contact angle hysteresis," Journal of Colloid and Interface Science vol. 191, Apr. 18, 1997, 7 pages.

Extrand and Yumagai, "Contact angles and hysteresis on soft surfaces," Journal of Colloid and Interface Science vol. 184, Jul. 16, 1996, 11 pages.

Freedman et al., "Hydrocarbon Saturation and Viscosity Estimation From Nmr Logging in the Belridge Diatomite," Society of Petrophysicists and Well-Log Analysts, Mar. 1997, 38(2):Abstract, 2 pages.

Haddad et al., "So What is the Reservoir Permeability?" SPE 63138 Annual Technical Conference and Exhibition, Dallas, TX, Oct. 1-4, 2000; Society of Petroleum Engineers, Inc., 2000, 24 pages.

He et al., "Comparison of Gelatin Behavior and Morphology of Resorcinol—Hexamethylenetetramine—HPAM Gel in Bulk and Porous Media," Transport Porous Media, 2015, 16 pages.

Kameda and Matsumoto, "Nonlinear oscillation of a spherical gas bubble in acoustic fields," Acoustical Society of America, Dec. 1999, 106(6), 11 pages.

Kruss, "Comparison of Wilhelmy and Sessile Drop Technique: A practical comparison of the techniques used to measure contact angles for liquids on non-porous solids," 1996 Annual Meeting of the Society of Tribologists and Lubrication Engineers, Lubrication Engineering, Tribology Transactions, Jan. 1996, 4 pages.

Kruss, "Drop Shape Analyzer—DSA100," Kruss: Advancing your Surface Science, available on or before Aug. 22, 2017, retrieved from URL <https://www.kruss-scientific.com/products/contact-angle/dsa100/drop-shape-analyzer-dsa100e/>, 8 pages.

(56) References Cited

OTHER PUBLICATIONS

Kruss, "Drop Shape Analyzer—DSA25," Kruss: Advancing your Surface Science, available on or before Aug. 22, 2017, retrieved from URL <https://www.kruss-scientific.com/products/contact-angle/dsa25/drop-shape-analyzer-dsa25/>, 4 pages.
Kruss, "Drop Shape Analyzer—DSA30," Kruss: Advancing your Surface Science, available on or before Jun. 2014, 4 pages.
Kruss-Scientific.com' [online], "Advancing Angle," available on or before Aug. 21, 2017, retrieved from URL<https://www.kruss.de/services/education-theory/glossary/advancing-angle/>, 1 page.
Kwak et al., "SPE-183719-MS-MS: Close Monitoring of Gel Based Conformance Control by NMR Techniques," Society of Petroleum Engineers, Mar. 2017, 15 pages.
Lamour et al., "Contact Angle measurements using a simplified experimental set-up," Journal of Chemical Education, vol. 87, No. 12, Dec. 2010, 5 pages.
MacDougall and Ockrent, "Surface energy relations in liquid/solid systems I. The adhesion of liquids to solids and a new method of determining the surface tension of liquids," Proceedings of the Royal Society of Medicine of London, vol. 180, Jun. 5, 1942, 23 pages.
Mahani et al., "Kinetics of the Low Salinity Waterflooding Effect Studied in a Model System," SPE Enhanced Oil Recovery Conference, Jul. 2, 2013, 14 pages.
Mars and Steele, "An instrument for the measurement of gelation time," Journal of Physics E: Scientific Instruments 1975, 8, 3 pages.
Natarajan et al., "Control of In-Situ Gelation Time for HPAAM-Chromium Acetate Systems," SPE 39696, presented at the 1998 SPE/DOE Improved Oil Recovery Symposium, Apr. 19-22, 1998, 13 pages.
Ohl, "Generator for single bubbles of controllable size," American Institute of Physics, Review of Scientific Instruments, Jan. 2001, 72(1), 4 pages.
Rao "Measurements of dynamic contact angles in solid-liquid-liquid systems at elevated pressures and temperatures," Colloids and Surfaces A: Physiochemical and Engineering Aspects, vol. 206, No. 1-3, Jul. 1, 2002, 14 pages.
Rao, "Correlation of Oil-Water Flow Behavior in Reservoir Rocks with Dynamic Contact Angles," Journal of Canadian Petroleum Technology, vol. 41, No. 7, Jul. 2002, 8 pages.
Roberts et al., "Ultrasonic Removal of Organic Deposits and Polymer Induced Formation Damage," SPE Formation Damage Control Symposium, Feb. 14-15, 1996, 9 pages.
Romero-Zeron et al., "SPE 86548: Characterization of Crosslinked Gel Kinetics and Gel Strength by Use of NMR," Society of Petroleum Engineers, Jun. 1, 2008, 12 pages.
Shedid and Ghannam, "Factors affecting contact-angle measurement of reservoir rocks," Journal of Petroleum Science and Engineering, vol. 44, Nov. 2004, 12 pages.
Straley et al., "Core analysis by low field NMR," Society of Core Analysis, presented at the 1994 International Symposium, Sep. 12-14, 1994, 14 pages.
Sydansk, "Acrylamide-Polymer/Chromium(III)-Carboxylate Gels for Near Wellbore Matrix Treatments," SPE Advanced Technology Series, Jan. 1990, 1.1:146-152, 6 pages.
Vasquez et al., "Laboratory Evaluation of High-Temperature Conformance Olymer Systems," SPE 80904 Production and Operations Symposium, Oklahoma City, Oklahoma, Society of Petroleum Engineers, Inc., Mar. 22-25, 2003, 11 pages.
Vinci Technologies, "Interfacial Tension Measurements with IFT 700," Vinci Technologies, available on or before May 2010, 5 pages.
Wu and Batycky, "Evaluation of miscibility from slim tube tests," Enhanced Oil Recovery, JCPT 90-06-06, vol. 29, No. 6, Nov.-Dec. 1990, 9 pages.
Wu et al., "Experimental Studies on the Shape and Path of Small Air Bubbles Rising in Clean Water," American Institute of Physics (AIP), AIP Publishing, Phys. Fluids, Jul. 2002, 14:7 (L49), 5 pages.
Yao et al., "Petrophysical characterization of coals by low-field nuclear magnetic resonance (NMR)," Fuel, Jul. 2010, 89(7), 10 pages.
Yousef et al., "The Impact of the Injection Water Chemistry on Oil Recovery from Carbonate Reservoirs," SPE-154077, presented at the SPE EOR Conference at Oil and Gas West Asia, Apr. 16-18, 2012, 14 pages.
Yuan and Lee, "Contact angle and wetting properties," Springer Verlag Berlin Heidelberg, Springer Series in Surface Sciences vol. 51, 2013, 33 pages.
Zhuang et al., "Permeability Modification with Sulfomethylated Resorcinol-Formaldehyde Gel System," SPE Reservoir Evaluation and Engineering, vol. 3, No. 5, presented at the 1997 SPE International Symposium on Oilfield Chemistry, Feb. 18-21, 1997, published Oct. 2000, 8 pages.

* cited by examiner

GASEOUS BUBBLE SYSTEM AND METHOD TO MEASURE GELATION TIME

TECHNICAL FIELD

This disclosure relates to methods and systems for determining a gelation time of a substance based on a rising gaseous bubble.

BACKGROUND

A gelation time of a substance is an important screening parameter in developing potential gel formulations. The gelation time is the point at which the gel solution, formed by a polymer plus the cross linker, form a gel. The gelation time may be determined based on nuclear magnetic resonance (NMR) or rheology. Conventional methods to estimate gelation time also include bottle tests. Bottle tests area widely adopted approach to characterize gelation-states and estimate gelation time. In such bottle tests, various states (A to J) are defined to represent the observed conditions upon the inversion of a gelant sample.

SUMMARY

In certain embodiments, a method to determine a gelation time of a substance in a container is disclosed. The method includes releasing, by a bubble generator at a first end of the container, gas into the first end of the container such that the gas bubbles rise from the first end of the container to a second end of the container, sensing, by a bubble sensor at the second end of the container, the released bubbles, determining an absence of a bubble released by the bubble generator at the bubble sensor within a predetermined time after having been released by the bubble generator, and determining a gelation time based on a total number of bubbles detected by the bubble sensor.

In some cases, releasing, by a bubble generator at a first end of the container, gas bubbles into the first end of the container such that the gas bubbles rise from the first end of the container to a second end of the container, includes releasing, by a bubble generator, a first set of bubbles, wherein the bubble generator releases each bubble in the first set of bubbles at predetermined intervals, sensing, by the bubble sensor, the first set of bubbles at the second end of the container, and determining a calibration travel time. In some methods, the calibration travel time is an average travel time of the first set of bubbles. Some calculated gelation times are based on the calibration travel time and/or the predetermined interval. In some methods, releasing, by a bubble generator at a first end of the container, gas bubbles into the first end of the container such that the gas bubbles rise from the first end of the container to a second end of the container, includes heating the container, by a heater, to a predetermined temperature.

Some methods also include sensing by a temperature sensor, a temperature of the substance in the container.

In some methods, releasing, by a bubble generator at a first end of the container, gas bubbles into the first end of the container such that the gas bubbles rise from the first end of the container to a second end of the container, includes releasing the gas bubbles at predetermined intervals.

In certain aspects, a system to determine a gelation time of a substance in a container includes a container having a first end and a second end, a bubble generator arranged at the first end of the container, and a bubble sensor arranged at the second end of the container. The container holds a substance having a surface adjacent the second end. The bubble generator is configured to generate a bubble at the first end of the container. The bubble sensor is configured to sense the bubble at the surface of the substance.

Some systems also include a temperature sensor, for example, a temperature sensor is arranged in the container.

Some systems also include a computer system. The computer system can have one or more processors; and a computer-readable medium storing instructions executable by the one or more processors to perform operations. The operations may include prompting the bubble generator to release bubbles at predetermined intervals, sensing, by the bubble sensor, the bubbles at the second end of the container, and determining that a bubble released by the bubble generator has not been detected by the bubble sensor.

The operations can also include calculating a gelation time based on a total number of bubbles detected by the bubble sensor.

In some systems, the bubble sensor is an ultrasonic scanner wherein the container is a tube.

Some containers are hollow coils.

Some systems also include a cover releasably attached to the second end of the container, wherein the bubble sensor is arranged in the cover.

In certain aspects, a system to determine a gelation time of a substance in a container includes a bubble generator arranged at a first end of the container, a bubble sensor arranged at a second end of the container, and a computer system. The bubble sensor is configured to sense the bubble at the second end of the container. The bubble generator is configured to generate a bubble at the first end of the container. The computer system has one or more processors and a computer-readable medium storing instructions executable by the one or more processors to perform operations. The operations can include prompting the bubble generator to release bubbles at predetermined intervals, sensing, by the bubble sensor, the bubbles at the second end of the container, determining that a bubble released by the bubble generator has not been detected by the bubble sensor, and calculating a gelation time based on a total number of bubbles detected by the bubble sensor.

Some systems also include a heater configured to heat the container to a predetermined temperature. The predetermined temperature can be between 60-95° C. according to the average reservoir temperatures.

The system can also include a cover attached to the container. The bubble sensor may be arranged in the cover. The cover may be a mesh cover.

The bubble sensor can be a resistivity sensor.

In certain aspects, a method to determine a gelation time of a substance in a container includes releasing, by a bubble generator, a first set of bubbles into the first end of the container such that the gas bubbles rise from the first end of the container to a second end of the container, sensing, by the bubble sensor, the first set of bubbles at the second end of the container, determining a calibration travel time, releasing, by the bubble generator at a first end of the container, a second set of bubbles, sensing, by the bubble sensor at the second end of the container, the released bubbles, determining a travel time of each bubble of the second set of bubbles, and determining a gelation time of the substance.

The gelation time of the substance can be based on the travel time of the second set of bubbles and the calibration travel time of the first set of bubbles.

The calibration travel time may be an average travel time of the first set of bubbles.

In some methods, the each bubble in the first set of bubbles is released at a predetermined interval.

In some methods, the each bubble in the second set of bubbles is released at a predetermined interval.

Releasing, by the bubble generator at a first end of the container, a second set of bubbles can include heating the container, by a heater, to a predetermined temperature.

Some methods also include sensing, by a temperature sensor, a temperature of the substance in the container.

This disclosure relates to methods and systems for determining a gelation time of a substance.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This disclosure relates to a gelation time measurement system that includes a bubble generator and a bubble sensor for determining a gelation time of a strong gelling substance and/or a weak gelling substance. The gelation time of a strong gelling substance is the time a liquid solution takes to gel such that a gaseous bubble is trapped within the substance and does not rise through the substance. In the case of a "strong gel" a substance is considered as "strongly gelled" when the viscosity increases to such a level that the substance no longer flows freely to retain the shape of the container in which it is placed, but instead obtains a rigid shape of its own. The bubble generator releases bubbles at predetermined intervals. The released bubbles rise through the substance and exit a surface of the substance where a bubble sensor detects the bubbles exiting the surface. The system continues releasing bubbles until a processor coupled to the sensor detects that a bubble, released from the bubble generator, did not break the surface of the substance and is trapped within the substance. The substance is considered to be strongly gelled and a gelation time is determined based on the measured travel times and the number of bubbles released that successfully traveled to the surface of the substance. The gelation time can also be calculated for a weak gelling substance as the time a liquid solution takes to gel such that a measured travel time of a bubble is significantly slower than a calibration travel time. A weak gel may be the final state of the substance or may be a transitionary condition on the way to a "strong" gel state. In the case of a "weak gel" a substance is considered as "weakly gelled" when the viscosity increases to such a level that the travel time of a bubble travelling through the substance is about 10 times slower than the calibration travel time measured previously.

The gelation time measurement system and method provide a uniform standard to determine gelation time and reduce human error by removing observation-based determination of gelation time. Further, the methods and systems have relatively small equipment that can be used for substances with long gelation times or short gelation times.

Figure 1:
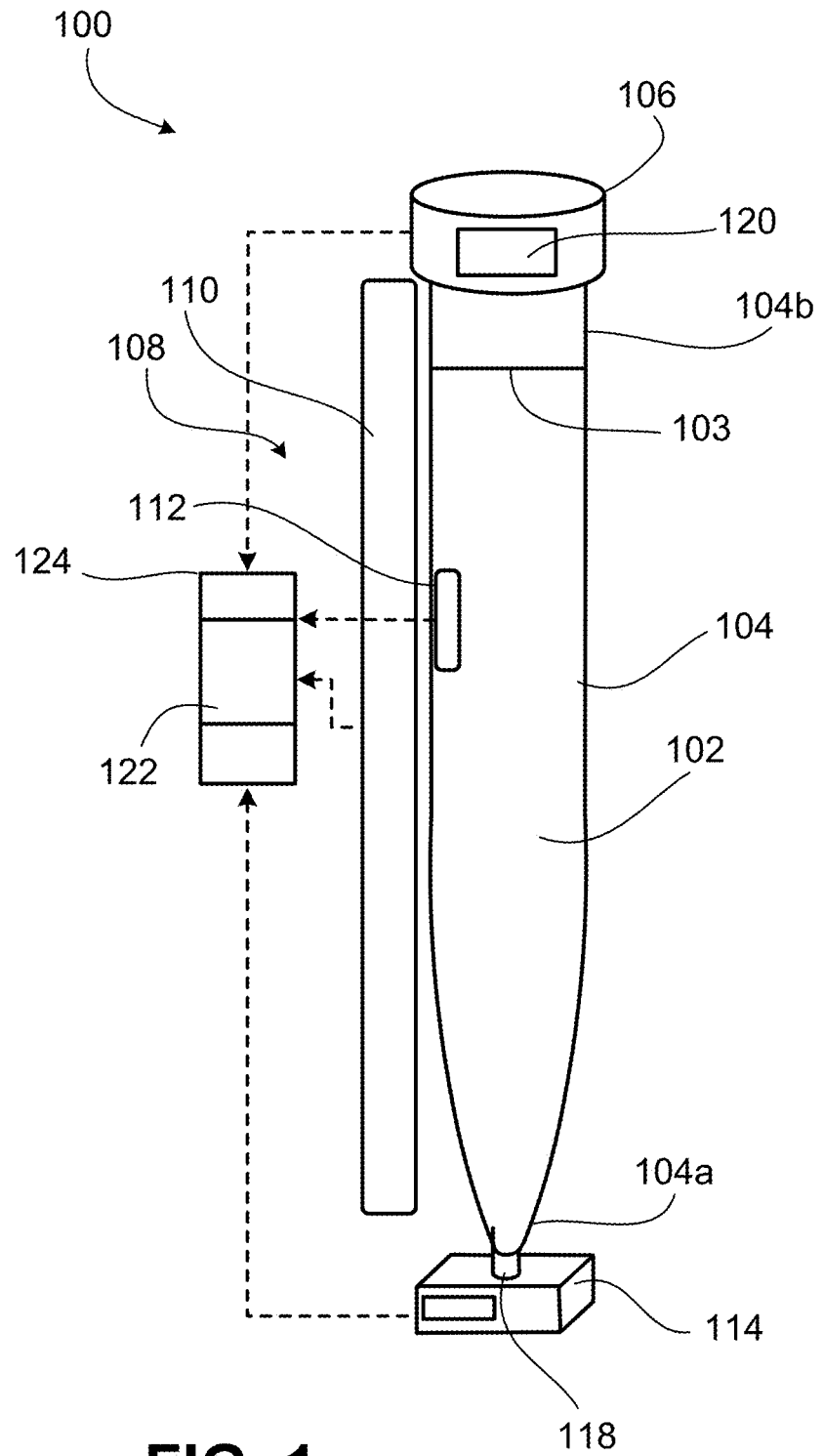
FIG. 1 is a cross-sectional front view of a gelation measurement system.

FIG. 1 is a schematic view of a gelation measurement system 100. The gelation measurement system 100 is configured to determine a gelation time of a substance 102 in a container 104. The container 104 may be a test tube, coil, or any other container with a hollow shape. The container has a first (lower) end 104a and a second (upper) end 104b. The substance 102, previously mixed with a cross-linker, can be inserted into the container 104 via an opening in the second end 104b such that a surface 103 of the substance 102 is adjacent or faces the second end 104b. In some cases, the substance and cross-linker are mixed overnight to prepare a thoroughly mixed substance. A cover, for example a lid 106, can be releasably attached (e.g., by threaded connection or a snap fit) to the second end 104b of the container 104 to seal the interior of the container 104 from the surrounding environment. The connection between the lid 106 and the second end 104b of the container 104 can withstand an increase in pressure (i.e. vapor pressure at the second end of the container) from the introduction of gas bubbles into the container 104. In some cases, the cover is a mesh cover, described in further detail with reference to FIG. 4. The substance 102 is configured to gel over a period of time.

The system 100 also includes a temperature sub-system 108 that provides a constant heat source to hold the substance 102 in the container 104 at a predefined temperature. The temperature sub-system 108 includes a heater 110 arranged outside the container 104 and a temperature sensor 112 arranged in the container 104. In some cases, the heater may be arranged in the container. Some temperature sensors are arranged outside the container.

The system also includes a bubble generator 114 arranged at or adjacent the first (lower) end 104a of the container 104. The first end 104a is oriented to be lower than the second end 104b, when observed by the bubble generator 114, so that bubbles travel from the first end 104a to the second end 104b. The bubble generator 114 is fluidly connected to the first end 104a of the container 104 to form a seal, for example, by a nozzle 118 of the bubble generator 114. The bubble generator 114 is configured to generate a bubble 116 at the first end 104a of the container 104. The bubble may be formed of air, oxygen, inert gases (e.g., helium, nitrogen, argon), a non-corrosive gas, or any other gaseous compound more buoyant than the substance in the container.

The system further includes a bubble sensor 120 arranged at a second end 104b of the container 104. The bubble sensor 120 is arranged in the lid 106, however, some bubble sensors are arranged within the interior of the container. Other bubble sensors are arranged adjacent the second end of the container, outside the container. The bubble sensor 120 is configured to sense the bubble 116 produced by the bubble generator 114, at the surface 103 of the substance 102. The bubble sensor 120 is configured to detect the bubble 116 as the bubble 116 breaks the surface 103, exiting the substance 102. The bubble sensor 120 is configured to detect a change in a pressure (e.g., a vapor pressure of the second end of the container) or a change in the surface 103 of the substance. Some bubble sensors detect the approach of the bubble or detect a change in pressure at the second end of the container. For example, the bubble sensor can be or include a vapor pressure sensor, an acoustic sensor, a visual sensor (e.g., a UV sensor, an image detection sensor, or a laser sensor), and/or a resistivity sensor. The visual sensors can be used with substances that are transparent or partially transparent, whereas the acoustic and resistivity sensors can be used with transparent, partially transparent, or opaque substances. The bubble sensor 120 is an ultrasonic scanner, for example, a 3.5 MHz ultrasonic scanner.

The bubble sensor 120 and bubble generator 114 are connected by a processor 122 such that the processor 122 knows the number of bubbles 116 generated by the bubble generator 114 and knows the number of bubbles 116 detected by the bubble sensor 120. A computer system 124 includes the processor 122. The computer system can be part of the bubble generator, bubble sensor, temperature subsystem, or separate therefrom. The computer system 124 includes computer-readable medium storing instructions executable by the processor 122 to perform operations. The operations include prompting the bubble generator to release bubbles at predetermined intervals, sensing, by the bubble sensor, the bubbles at the second end of the container, and determining that a bubble released by the bubble generator has not been detected by the bubble sensor.

The bubble generator 114 transmits initial bubble (first) data to the processor 122 for determining the gelation time. The initial bubble data can include the gaseous composition of the bubble, gas density, bubble size, bubble release time, and number of released bubbles. The initial bubble data may be sensed or measured by the bubble generator or the bubble generator may be programed with the initial bubble data to produce a bubble of known gas type, gas density, and/or size. The bubble generator can also be programmed to release bubbles at specific time intervals. For example, the processor may prompt the bubble generator to release a first set of bubbles at a first interval or frequency and release a second set of bubbles at a second interval or frequency. In addition, the processor can prompt the bubble generator to release bubbles of different sizes. The bubble generator is able to release bubbles with diameters of 100 micrometers (µm) to about 0.5 centimeters (cm), for example diameters of about 6 millimeters (mm) to about 600 mm or 0.2 mm to about 0.5 mm. The bubble sensor 120 transmits traveled bubble (second) data to the processor 122 for determining the gelation time. The traveled bubble data can include the number of bubbles detected to break the surface of the substance, pressure changes in the second end of the container, time, and the time at which the bubble was detected.

FIG. 2A-2E are cross-sectional side views of the gelation measurement system 100 in use as the substance 102 gels. FIG. 2A shows the system 102 as a gelant solution 102a that is a liquid through which gaseous bubbles can flow. The lid 106 is attached and the bubble generator 114 begins to form a bubble 116. FIGS. 2A and 2B show the gelation measurement system 100 during a calibration stage in which a first set of bubbles 116 are generated and detected to establish a calibration travel time. The calibration travel time can be an average of the travel times of each bubble 116. The travel time of each bubble is the time it takes for the bubble to move or rise from release at the first end 104a to detection at the second end 104b of the container 104. After calibration, the substance 102 begins to gel and increase in viscosity.

FIG. 2C shows the substance 102 as a viscous gel solution 102b. Due to the increase in viscosity from the gelling of the substance 102, the bubbles 116 move slower through the viscous gel solution 102b than in the gelant solution 102a. The bubbles 116 are released in intervals, after a predetermined amount of time has elapsed. The bubbles 116 in the gelation measurement system 100 are released at intervals of seconds, minutes, or hours. For example, the interval may be between 1 second (sec.) to 10 sec, 10 sec. to 30 sec., 30 sec to 60 sec., 1 minute (min.) to 5 min., 5 min to 20 min., 20 min. to 40 min., 40 min to 60 min., 1 hour, 1.5 hours, 2 hours, 2.5 hours 3 hours, 3.5 hours, 4 hours, 4.5 hours, 5 hours, 5.5 hours, 6 hours, 6.5 hours, 7 hours, 7.5 hours, or 8 hours. In some cases, the interval is every 1 second, 2 seconds, 3 seconds, 4 seconds, 5 seconds, 6 seconds, 7 seconds, 8 seconds, 9 seconds, 10 seconds, 15 seconds, 20 seconds, 25 seconds, 30 seconds, 40 seconds, 45 seconds, 50 seconds, or 55 seconds. In some cases, the interval is every 1 minute, 1.5 minutes, 2 minutes, 2.5 minutes, 3 minutes, 2.5 minutes, 4 minutes 4.5 minutes, 5 minutes, 6 minutes, 7 minutes, 8 minutes, 9 minutes, 10 minutes, 15 minutes, 20 minutes, 25 minutes, 30 minutes, 35 minutes, 45 minutes, 50 minutes, 55 minutes, 1 hour, 2 hours, 5 hours, or 12 hours. The interval time can be chosen based on the substances being used and/or based on the intended application of the substance. For example, gels used in bonding applications (e.g., adhering, attachment, gluing, or sealing) generally gel within 30 seconds, therefore, the interval time may be set to 1 second, 5 seconds, or 10 seconds. For example, gels used in biomedical, cosmetic, pharmaceutical, and/or bonding applications, may generally gel within 45 minutes seconds, therefore, the interval time may be set to 1 minutes, 5 minutes, 10 minutes, or 15 minutes. For example, gels used in Enhancing Oil recovery (EOR) and/or Improved Oil Recovery (IOR) applications, generally gel within hours or days, therefore, the interval time may be set to 1 hours, 2 hours, 5 hours, 10 hours, 15 hours, 20 hours, or 24 hours. Gels used in EOR and IOR applications generally gel within hours or days so that the gel can travel deep into the formation. In some systems, a subsequent bubble in the second set of bubbles is released only in response to the bubble sensor detecting the preceding bubble at the second end of the container (e.g., surface of the substance).

FIG. 2D shows the substance 102 as a partially gelled solution 102c. Due to the increase in viscosity from the gelling of the substance 102, the bubbles 116 move slower through the partially gelled solution 102c than in the viscous gel solution 102b.

FIG. 2E shows the substance 102 as a gelled solution 102d. The bubble 116 generated by the bubble generator 114 cannot move through the gelled solution from the first end 104a to the second end 104b, but rather, is trapped within the gelled solution 102d. The bubble 116 is determined to be trapped if a released bubble 116 is not detected by the bubble sensor 120a predetermined time, for example, 5 minutes. In some cases the predetermined time is between 1 second and 5 hours, for example 10 seconds, 30 seconds, 45 seconds, 1 minutes, 5 minutes, 10 minutes, 15 minutes, 20 minutes, 30 minutes, 45 minutes, 50 minutes, 1 hours, 1.5 hours, 2 hours, 2.5 hours, 3 hours, 3.5 hours, 4 hours, 4.5 hours, or 5 hours.

Figure 3:
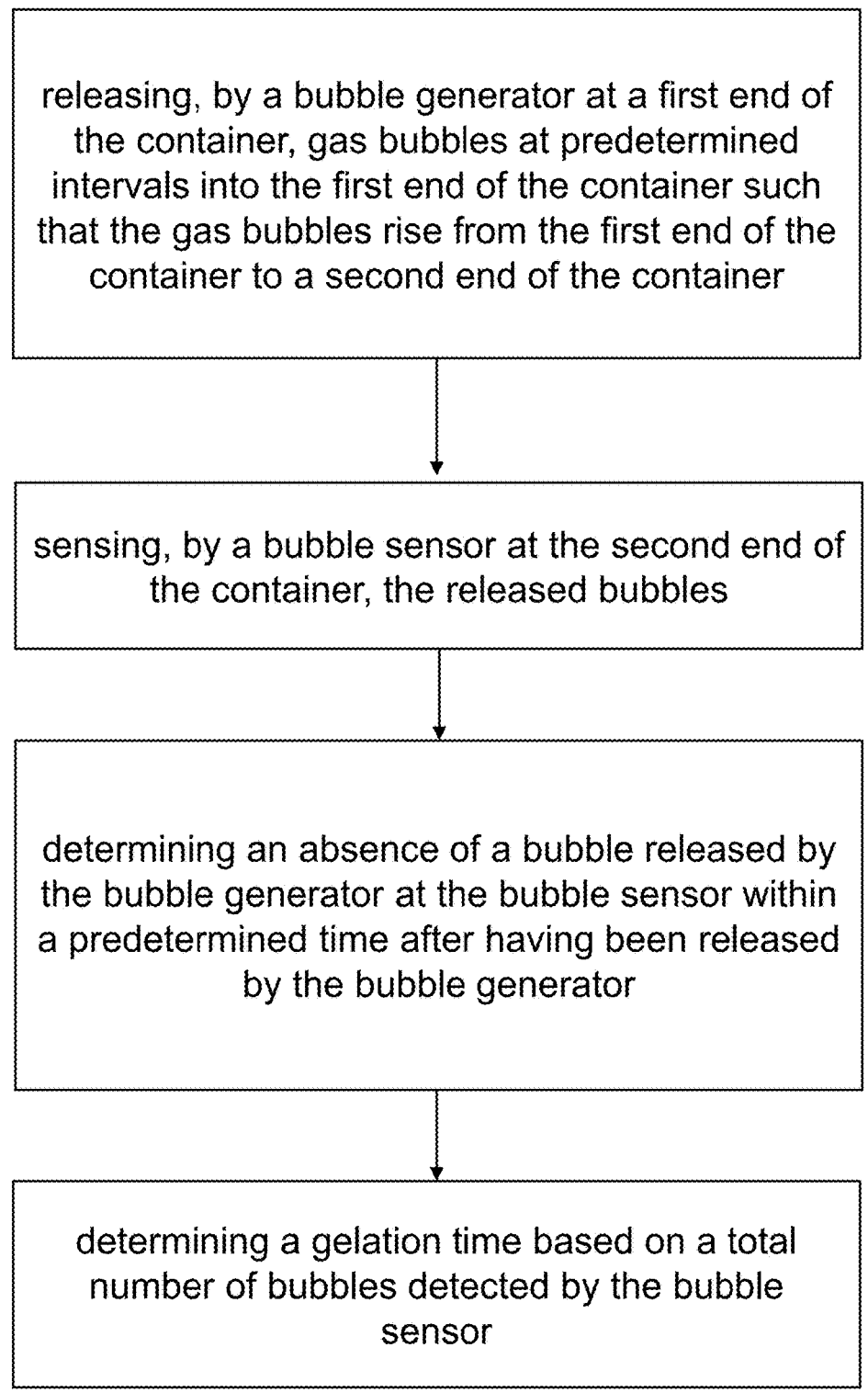
FIG. 3 is a flowchart of a method for determining a gelation time of a substance using a gelation measurement system.

FIG. 3 is a flowchart of a method 200 for determining a gelation time of a substance using a gelation measurement system. The method 200 is described with reference to the gelation measurement system 100, however, the method may be used in any other applicable system or apparatus. The method 200 is used with a gelled solution, that is a considered a "strong gel" (i.e. a gel through which a gaseous bubble does not pass when fully gelled). The gelled solution should be selected such that the solution, at any stage of gelation, obeys Stokes Law.

The operator mounts the first end 104a of the container 104 onto the nozzle 118 of the bubble generator 114. The nozzle 118 and container 104 form a seal so that liquid cannot leak form the container 104. The operator then fills the container 104 via the open second end 104b of the container 104 with a gelant solution 102a and attached the cover to the second end 104b of the container 104, thereby aligning the bubble sensor 120 with the surface 103 of the gelant solution 102a. The gelant solution is generally liquid with a known viscosity. In some cases, an operator identifies whether the substance is a strong gelling substance or a weak gelling substance.

The method 200 includes calibrating the gelation measurement system 100. The processor 122 prompts the bubble generator 114 to release a first set of bubbles at known calibration travel time intervals (e.g., 30 seconds). Some calibration intervals can be between 0.5 seconds to 10 minutes. The bubble sensor 120 provides the time at which each bubble in the first set of bubbles is detected at the second end 104b of the container 104 so that the processor 122 calculates the travel time of each bubble 116 in the first set and calculates the average travel time (calibration time) of the first set of bubbles 116. The first set may include two to twenty bubbles.

After calibration, the heater 110 heats the container 104 to a predetermined temperature, for example, a temperature between 25° C. and 100° C., for example about 60° C. The heater 110 can be prompted by the processor 122. The substance 102 begins to cross-link as the substance 102 approaches the predetermined temperature. The heater can be connected to and/or controlled by the processor. In some cases, the gelation measurement system includes a temperature sensor connected to the processor.

Once calibrated, the processor 122 also prompts the bubble generator 114 to release a second set of bubbles 116 at predetermined measurement intervals, for example 30 minutes between each released bubble 116. The measurement intervals are the same length as the calibration intervals. In some cases, the measurement intervals are 0.5 seconds to 20 hours. Some measurement intervals are longer or shorter than the calibration intervals. The calibration intervals and the measurement intervals may be the same, or may be different. In some cases, each bubble of the second set is released only after the bubble sensor has detected a bubble at the second end of the container, thereby confirming that the preceding bubble has traveled to the bubble sensor and has not been trapped in the strongly gelled solution.

The temperature sensor 112, arranged in the container, can send temperature signals to the processor 122 to determine the temperature of the substance 102.

The bubbles 116 travel through the substance 102, slowing as the substances 102 gels. The processor 122, by the bubble sensor 120, senses the bubbles 116 at the second end 104b of the container 104 and counts the number of detected bubbles 116. The bubble generator 114 continues to generate bubbles as the gelant solution 102a gels into a viscous gelant solution 102b, and then into a partially gelled solution 102c. The bubble sensor 120 continues to detect the bubbles 116 at the second end of the container 104.

When the strong gelled solution 102d forms, the released bubble 116 can no longer travel from the first end 104a of the container 104 to the second end 104b of the container 104 due to the viscosity of the gelled solution 102d. The bubble sensor 120 does not sense the bubble 116 exiting the gelled solution 102d and the initial bubble data sent to the processor 122 indicates the amount of time elapsed without detection of a released bubble. The processor 122 determines that a bubble released by the bubble generator 144 has not been detected by the bubble sensor 120 in a predetermined time from release, e.g., at least 5 minutes. If the bubble sensor 120 has not detected a released bubble in the predetermined time, (e.g., 5 min, 10 min, 1 hour, 6 hours, 1 day, 7 days), the substance is defined as gelled and a gelation time is calculated.

The gelation time of the strong gelled solution 102d can be calculated using the number of detected bubbles by the detector (one less than the number of released bubbles), the calibration travel time, and the measurement interval time. In some cases, the gelation time is also calculated based on the densities of the substance 102 and gas in the bubble 116, the viscosity of the substance 102, a diameter of the bubbles 116, and a height of the container or length of the path from the first end 104a to the second end 104b.

The processor calculates the gelation time using the following equation:

$$t = (n_b-1)(t_c) + (n_b-1)(t_s) \quad \text{(Equation 1)}$$

where $n_b$ is the total number of bubbles released $t_c$ is the average travel time (calibration time) obtained during calibration, and $t_s$ is the measurement interval between bubble releases (if any). In Equation 1, it is assumed that a travel distance of the trapped bubble is negligible.

The processor 122 can also calculate the gelation time using the equation:

$$t = \frac{(9\mu)}{2gd^2(\rho_1 - \rho_2)}(n_b - 1)(H_c) \quad \text{(Equation 2)}$$

where μ is the gelant viscosity, $\rho_1$, $\rho_2$ are the densities of the gas and gelant respectively, d is the diameter of the generated bubbles, $n_b$ is the number to bubbles released by the bubble generator, and the distance travelled by the bubble $H_c$, The distance travelled by the bubble in the container 104 from the bubble generator to the surface of the substance. In the system 100, the distance travelled by the bubble $H_c$, is height of the substance 102 in the container 104 as the bubble flows in a straight vertical path from the bubble generator to the surface 103 of the substance 102. Different shaped containers may result in bubble paths that are not linear, as shown in FIGS. 2A-2E, for example, coiled tubes may have bubble paths that are helical. When using a coil, the distance travelled by the bubble can be determined by the equation:

$$H_c = (\pi)(D_{coil})(t),$$

where $D_{coil}$ is the mean diameter of the coil and toil is the number of turns in the coil. A system with coiled tubing may reduce the number of released bubbles due to the increased length of the travel path. The diameter d, of each bubble generated, is determined by the processor. The bubble size is the same for each bubble generated in an experiment. In some cases, the bubble size may vary in an experiment. For example, the bubble size for calibration may be larger or smaller than the bubble size during gelation measurement. In Equation 2, it is assumed that a travel distance of the trapped bubble is negligible and that the viscosity build up is fast.

In some cases, the processor includes or is connected to a timer. The gelation time can be determined as the difference between the time at which the heater began heating the substance in the container and the time at which the first undetected bubble was released. In some cases, the timer is started at the same time the heater begins heating the container.

In some cases, the container is a coiled tubing, for example a slim tube. A slim tube is a long coiled tube hollow tube filled with the substance. In such a case, the system also includes an acoustic sensor configured to detect the location of the bubble in the slim tube. When a bubble is determined to be trapped, the processor can calculate the gelation time using Equation 3:

$$t = \frac{(9\mu)}{2gd^2(\rho_1 - \rho_2)}(n_b + x_b)(H_c) \qquad \text{(Equation 3)}$$

where $\mu$ is the gelant viscosity, $\rho_1$, $\rho_2$ are the densities of the gas and gelant respectively, d is the diameter of the generated bubbles, $n_b$ is the number to bubbles released by the bubble generator, $H_c$ the distance travelled by the bubble and $x_b$ is the fraction of the slim tube that was traveled by the last bubble.

Figure 4:
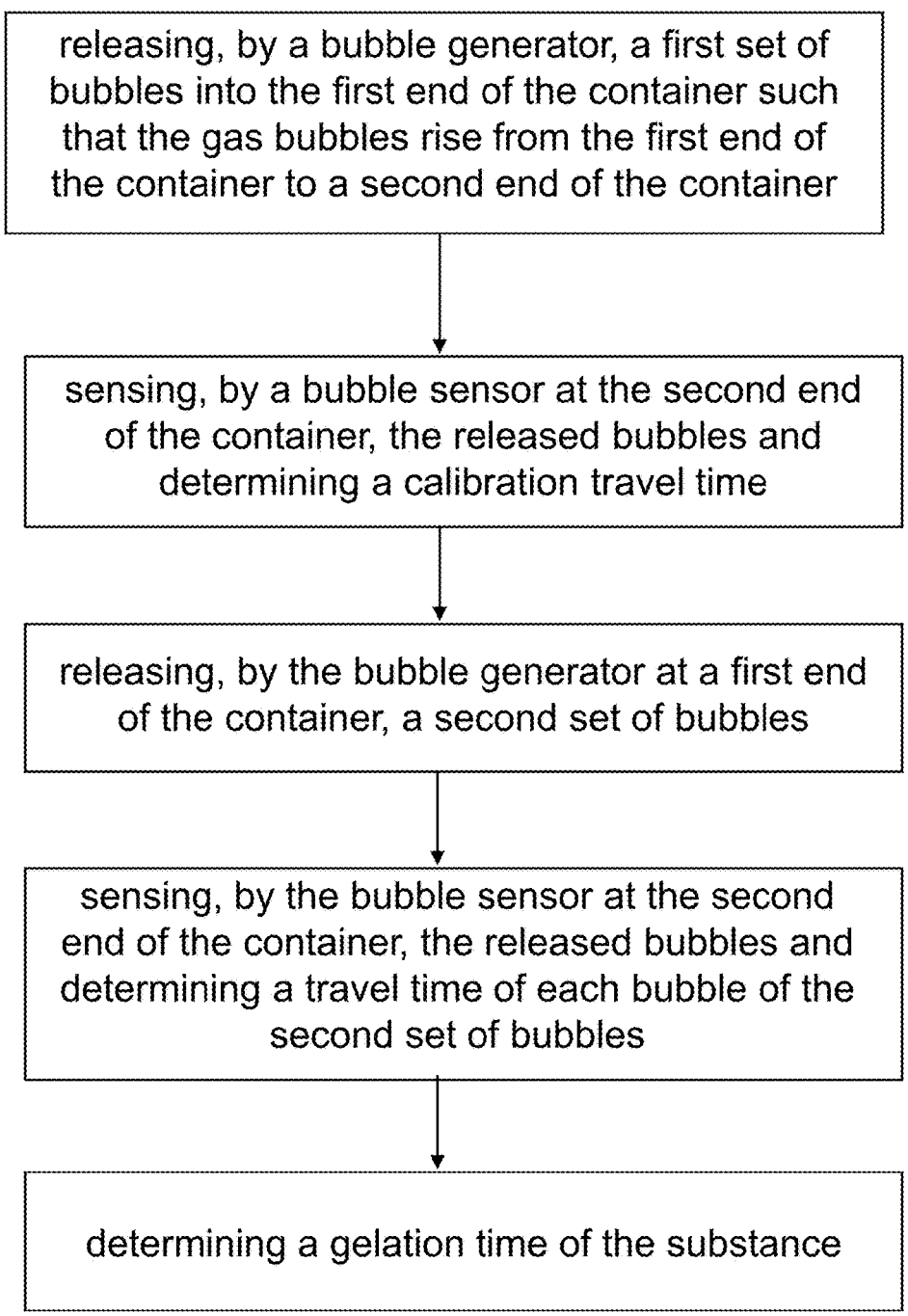
FIG. 4 is a flowchart of a method for determining a gelation time using the gelation measurement system.

FIG. 4 is a flowchart of a method 250 for determining a gelation time using the gelation measurement system 100. The method 250 can be used to determine a weak gelation time of a "weak gel". The method 250 is be substantially similar to the method 200, however, the method 250 includes comparing the travel time of a gas bubble to the calibration travel time, rather than detecting that a bubble is trapped in the gelled solution 102d. The method 250 is described with reference to the gelation measurement system 100, however, the method 250 can be used with any applicable system.

The operator mounts the first end 104a of the container 104 onto the nozzle 118 of the bubble generator 114. The nozzle 118 and container 104 form a seal so that liquid cannot leak form the container 104. The operator then fills the container 104 via the open second end 104b of the container 104 with a gelant solution 102a and attached the cover to the second end 104b of the container 104, thereby aligning the bubble sensor 120 with the surface 103 of the gelant solution 102a. The gelant solution is generally liquid with a known viscosity.

The method 200 includes calibrating the gelation measurement system 100. The processor 122 prompts the bubble generator 114 to release a first set of bubbles at known calibration travel time intervals (e.g., 30 seconds). Some calibration intervals can be between 0.5 seconds to 10 minutes. The bubble sensor 120 detects each released bubble in the first (calibration) set of bubbles, so that the processor 122 can calculate the travel time of each bubble 116. The processor 122 calculates the average travel time (calibration time) of the first set of bubbles 116. The first set may include two to twenty bubbles.

After calibration, the heater 110 heats the container 104 to a predetermined temperature, for example, a temperature between 25° C. and 100° C., for example about 60° C. The heater 110 can be prompted by the processor 122. The substance 102 begins to cross-link as the substance 102 approaches the predetermined temperature. The heater can be connected to and/or controlled by the processor. In some cases, the gelation measurement system includes a temperature sensor connected to the processor.

Once calibrated, the processor 122 also prompts the bubble generator 114 to release a second set of bubbles 116 at predetermined measurement intervals. The measurement intervals are the same length as the calibration intervals. In some cases, the measurement intervals are 0.5 seconds to 8 hours. Some measurement intervals are longer or shorter than the calibration intervals. The calibration intervals and the measurement intervals may be the same, or may be different. In some cases, each bubble of the second set is released only after the bubble sensor has detected a bubble at the second end of the container, thereby confirming that the preceding bubble has traveled to the bubble sensor and has not been trapped in the gelled solution.

The bubbles 116 travel through the substance 102, slowing as the substances 102 gels. The processor 122, by the bubble sensor 120, senses the bubbles 116 at the second end 104b of the container 104 and counts the number of detected bubbles 116. The bubble generator 114 continues to generate bubbles as the substance 102 gels and increases in viscosity. As the viscosity increases, the travel time of the bubbles in the second set of bubbles increases. The processor 122 determines that the substance is weakly gelled when the travel time of a bubble in the second set of bubbles is ten times slower than the calibration travel time of the first set of bubbles. For example, a substance with a calibration travel time measured to be 1 minute would be considered "weakly gelled" when the travel time of a bubble in the second set of bubbles takes at least 10 minutes to travel from the bubble generator to the surface 103 of the substance 102. In some cases, the substance is considered weakly gelled when the travel time is at least 2 times, 3 times, 4 times, 5 times, 8 times, 10 times, 15 times, 20 times, 25 times, 30 times, 40 times, 45 times, 50 times, 60 times, 75 times, 90 times, 100 times, 200 times, 300 times, 400 times, or 500 times slower than the calibration travel time. In other cases, the substance is considered strongly gelled when the travel time is at least 1300 times, 1400 times or 1500 times slower than the calibration travel time.

In addition, some systems, for example the gelation measurement system 100, can identify a gelation onset time and categorize the gelling substance as a "high-viscosity gel" or "low-viscosity gel". The determination of a gel onset time and categorization of the gelling substance can occur simultaneously with the gelation time determination or can occur independently. Further, the system can send an operator notifications when the onset time and/or categorization of the gelling substance is determined via a connected computer system or a connected display.

The gelation onset time occurs when the travel time of a released bubble is 2 times slower than the calibration time (e.g., the viscosity of the substance is two times higher than the initial viscosity of the substance). Upon determining, by the bubble sensor and processor, the travel time of a bubble travelling through the substance is about 2 times slower than the calibration travel time measured previously, the processor determines the gelation onset time. The processor may prompt a display or connected electronic device to alert the operator that the gelation onset time has occurred, for example by a notification.

The system 100 can also categorize the gelling substance as a "low-viscosity gel" or a "high viscosity gel". In the case of a "low-viscosity gel", a substance is considered to have a "low viscosity period" (e.g., a low-viscosity state) when the viscosity increases to such a level that the travel time of a bubble travelling through the substance is about 15 times slower than the calibration travel time measured previously. A low-viscosity gel may be the final state of the substance or may be a transitionary condition on the way to a high-viscosity state, a "weak gel" state, and/or or a "strong gel" state. In some cases, the low-viscosity state occurs when a bubble travelling through the substance is about 5 to about 25 times slower than the calibration travel time measured previously, for example, 6 times slower, 8 times slower, 10 times slower, 11 times slower, 12 times slower, 13 times slower, 14 times slower, 16 times slower, 17 times slower, 18 times slower, 19 times slower, 20 times slower, 22 times slower, and/or 24 times slower. Upon determining, by the bubble sensor and processor, the travel time of a bubble travelling through the substance is about 15 times slower than the calibration travel time measured previously, the processor determines that the gelling substance has achieved a "low-viscosity state". The processor may prompt a display or connected electronic device to alert the operator that the gelling substance has achieved at least a "low-viscosity state", for example by a notification.

In the case of a "high-viscosity gel", a substance is considered to have a "high viscosity period" (e.g., a high-viscosity state) when the viscosity increases to such a level that the travel time of a bubble travelling through the substance is about 50 times slower than the calibration travel time measured previously. A high-viscosity state may be the final state of the substance or may be a transitionary condition on the way to a "weak gel" state, and/or or a "strong gel" state. In some cases, the high-viscosity state occurs when a bubble travelling through the substance is about 30 to about 70 times slower than the calibration travel time measured previously, for example, 35 times slower, 40 times slower, 45 times slower, 46 times slower, 47 times slower, 48 times slower, 49 times slower, 51 times slower, 52 times slower, 53 times slower, 54 times slower, 55 times slower, 60 times slower, and/or 65 times slower. Upon determining, by the bubble sensor 120 and processor 122, the travel time of a bubble travelling through the substance is about 50 times slower than the calibration travel time measured previously, the processor 122 determines that the gelling substance has achieved a "high-viscosity state". The processor may prompt a display or connected electronic device to alert the operator that the gelling substance has achieved a "high-viscosity state", for example by a notification.

In some cases, the system 100 determines the gelation time without identifying the gelling substance as a "weak gel" or a "strong gel". In such a system, the processor 122 can identify the gelation time as the "gel onset" time, the time at which the gelling substance is classified as a "low-viscosity gel", or the time at which the gelling substance is classified as a "high-viscosity gel".

Figure 2:
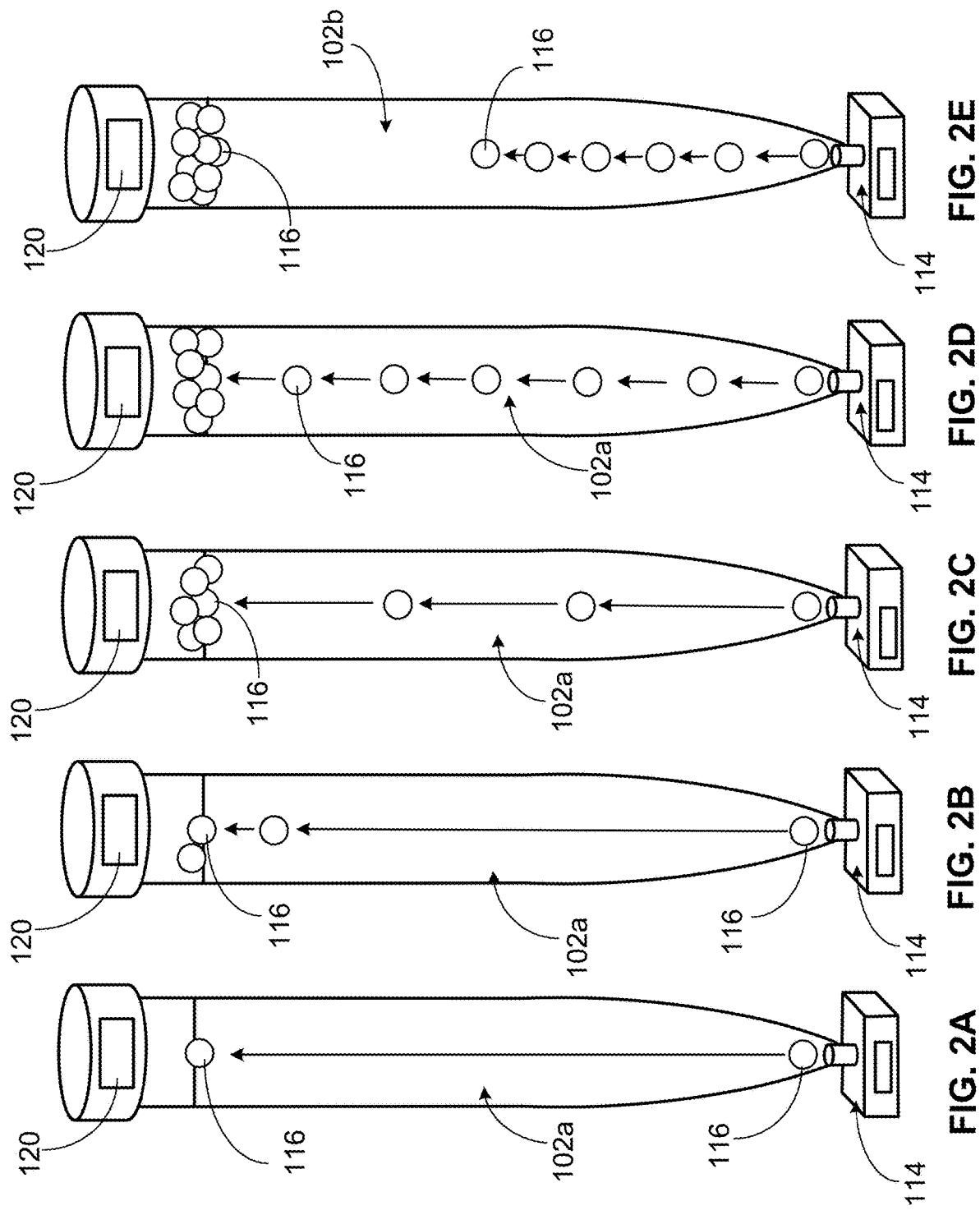
FIG. 2A-2E are cross-sectional side views of the gelation measurement system in use as a substance gels.

A method for determining the gelation without identifying the gelling substance as a "strong gel" or a "weak gel" is similar to the method 200 and 250, described with respect to FIGS. 2 and 3. The method is described with reference to the system 100, but can be used with any applicable system. The method includes calibrating the gelation measurement system 100. The processor 122 prompts the bubble generator 114 to release a first set of bubbles at known calibration travel time intervals (e.g., 30 seconds). Some calibration intervals can be between 0.5 seconds to 10 minutes. The bubble sensor 120 detects each released bubble in the first (calibration) set of bubbles, so that the processor 122 can calculate the travel time of each bubble 116. The processor 122 calculates the average travel time (calibration time) of the first set of bubbles 116. The first set may include two to twenty bubbles.

After calibration, the heater 110 heats the container 104 to a predetermined temperature, for example, a temperature between 25° C. and 100° C., for example about 60° C. The heater 110 can be prompted by the processor 122. The substance 102 begins to cross-link as the substance 102 approaches the predetermined temperature. The heater can be connected to and/or controlled by the processor. In some cases, the gelation measurement system includes a temperature sensor connected to the processor.

Once calibrated, the processor 122 also prompts the bubble generator 114 to release a second set of bubbles 116 at predetermined measurement intervals. The measurement intervals are the same length as the calibration intervals. In some cases, the measurement intervals are 0.5 seconds to 8 hours. Some measurement intervals are longer or shorter than the calibration intervals. The calibration intervals and the measurement intervals may be the same, or may be different. In some cases, each bubble of the second set is released only after the bubble sensor has detected a bubble at the second end of the container, thereby confirming that the preceding bubble has traveled to the bubble sensor and has not been trapped in the gelled solution.

The bubbles 116 travel through the substance 102, slowing as the substances 102 gels. The processor 122, by the bubble sensor 120, senses the bubbles 116 at the second end 104b of the container 104 and calculates the travel time or determines the travel time by a timer. When travel time is two times slower than the calibration time, the processor 122 determines that onset gelation time has occurred. The onset gelation time may be saved to a memory of the computer system and/or can be displayed on a display of the computer system.

The bubble generator 114 continues to generate bubbles as the substance 102 gels and increases in viscosity. As the viscosity increases, the travel time of the bubbles in the second set of bubbles increases. The processor 122 categorizes the gelling substance as a "low-viscosity gel" when the travel time of a bubble in the second set of bubbles is fifteen times slower than the calibration travel time of the first set of bubbles. For example, a substance with a calibration travel time measured to be 1 minute would be considered to be in a "low-viscosity state" when the travel time of a bubble in the second set of bubbles takes about 15 minutes to travel from the bubble generator to the surface 103 of the substance 102. In some cases, the substance is considered to have a low-viscosity state when the travel time is at least 2 times slower, 3 times slower, 4 times slower, 5 times slower, 8 times slower, 10 times slower, 15 times slower, 20 times slower, 25 times slower, 30 times slower, 40 times slower, 45 times slower, 50 times slower, 60 times slower, 75 times slower, 90 times slower, 100 times slower, 200 times slower, 300 times slower, 400 times slower, 500 times. The "low-viscosity period" time may be saved to a memory of the computer system and/or can be displayed on a display of the computer system.

Some gels can continue to increase in viscosity. The bubble generator 114 continues to generate bubbles as the substance 102 gels and the travel time of the bubbles 116 in the second set of bubbles increases. The processor 122 categorizes the gelling substance as a "high-viscosity gel" when the travel time of a bubble 116 in the second set of bubbles is fifty times slower than the calibration travel time of the first set of bubbles. For example, a substance with a calibration travel time measured to be 1 minute would be considered to be in a "high-viscosity state" when the travel time of a bubble in the second set of bubbles takes about 50 minutes to travel from the bubble generator to the surface 103 of the substance 102. In some cases, the substance is considered to have a high-viscosity state when the travel time is at least 30 to about 70 times slower than the calibration travel time measured previously, for example, 35 times slower, 40 times slower, 45 times slower, 46 times slower, 47 times slower, 48 times slower, 49 times slower, 51 times slower, 52 times slower, 53 times slower, 54 times slower, 55 times slower, 60 times slower, and/or 65 times slower, 60 times slower, 75 times slower, 90 times slower, 100 times slower, 200 times slower, 300 times slower, 400 times slower, 500 times slower, 1000 times slower, 1200 times slower, 1500 times slower, 1700 times slower, 2000 times slower, 2500 times slower, 3000 times slower, 4000 times slower, or 5000 times. The "high-viscosity period" time may be saved to a memory of the computer system and/or can be displayed on a display of the computer system.

The method may continue for a predetermined amount of time, for example 2 hours, 4 hours, 8 hours, 10 hours, 12 hours, 15 hours, 18 hours, a day, 2 days, 3 days, 4 day, 5 days, a week, 2 weeks, or a month. Elapsed time may be tracked by the processor or by a timer of the computer system. The elapsed time may begin as the heater begins to heat the gelling substance, or as the first set of bubbles is released from the bubble generator. Once the predetermined amount of time has expired, the processor 122 determines the gelation time. If the gelling substance was categorized as a "high viscosity gel", the gelation time is the "high-viscosity period" time (e.g., the time at which the processor identified the gelling substance as a "high-viscosity gel"). If the gelling substance was not categorized as a "high viscosity gel" but was categorized as a "low-viscosity gel", the gelation time is the "low-viscosity period" time (e.g., the time at which the processor identified the gelling substance as a "low-viscosity gel"). If the gelling substance was not categorized as a "high viscosity gel" or a "low-viscosity gel", the gelation time is the "gel onset" time.

Figure 5:
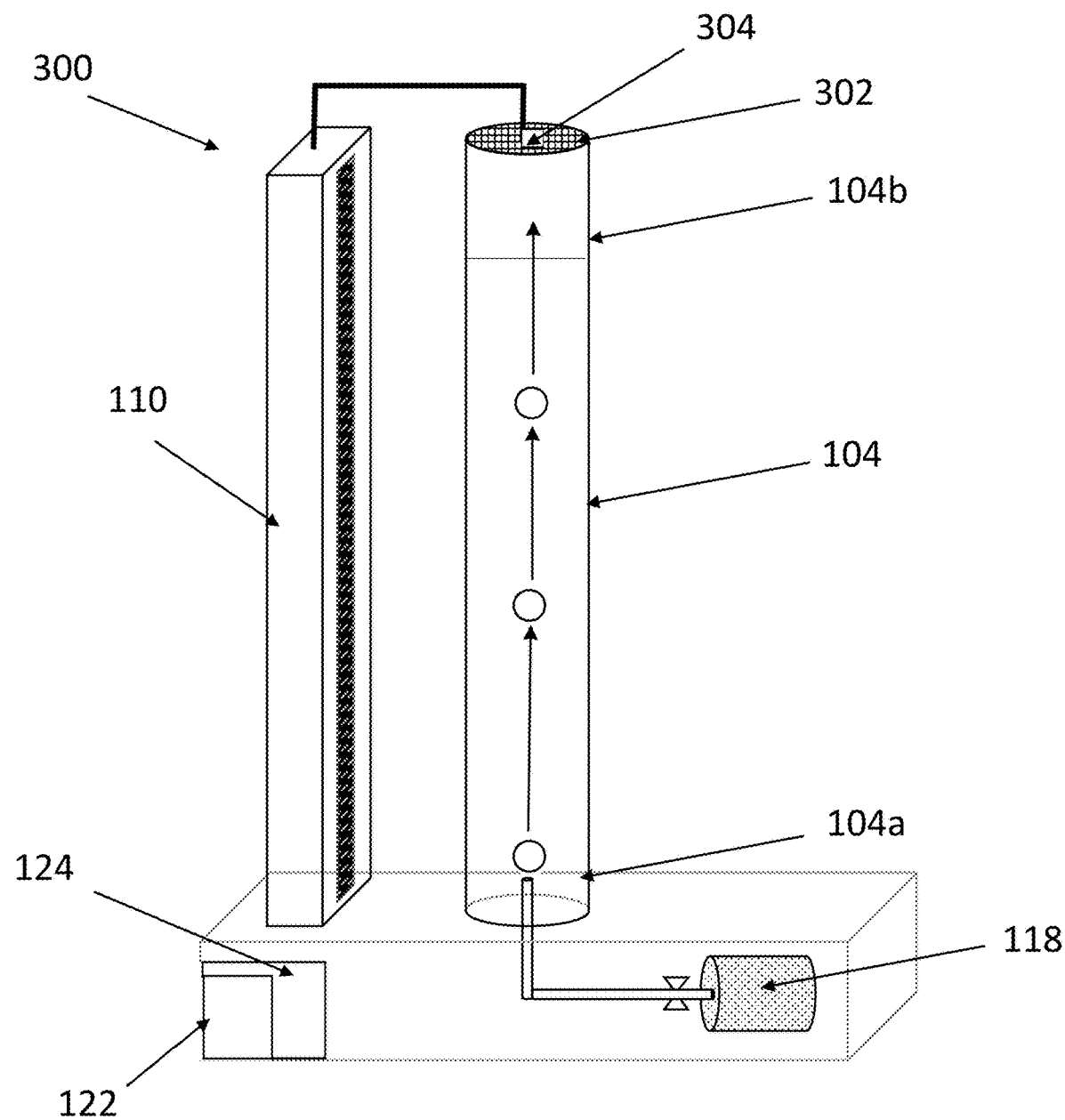
FIG. 5 is a cross sectional view of a gelation measurement system with a mesh cover.

FIG. 5 is a cross sectional view of a gelation measurement system 300 with a mesh cover 302. The gelation system 300 is substantially similar to the gelation measurement system 100, however, the gelation measurement system 300 includes a mesh cover 302 rather than a lid 106. The mesh cover 302 is arranged at or below the surface 103 of the substance 102 such that the mesh cover 302 is immersed in or flush with the substance 102 at the second end 104b of the container 104. The mesh cover 302 includes a bubble sensor 120, for example a resistivity sensor 304, connected to the processor and configured to detect a change in resistivity.

In use, the resistivity sensor reads a constant resistivity of the substance. When a bubble passes through the mesh cover 302 from the substance 102, the resistivity decreases and the processor determines that a bubble has completed passage through the substance 102. The bubble is released into the environment.

Some bubble sensors are resistivity sensors, acoustic sensors, or imaging sensors.

While bubble generators arranged at the first end of the container have been described, some bubble generators are arranged anywhere within or on the container, below the bubble sensor.

While bubble sensors arranged at the second end of the container have been described, some bubble sensors are arranged anywhere within or on the container, above the bubble generator.

While systems that internally release bubbles has been described, some systems have bubble generators that release a bubble only after the previously released bubble has been detected.

In some cases, the system is configured to notify an operator that the gelation time has been determined, for example by a notification on a display of the computer system or connected electronic device.

A number of embodiments have been described. Nevertheless, it will be understood that various modifications may be made without departing from the spirit and scope. Accordingly, other embodiments are within the scope of the following claims.

What is claimed is:

1. A method to determine a gelation time of a substance in a container, the method comprising:
   releasing, by a bubble generator at a first end of the container, a first set of bubbles into the first end of the container at predetermined intervals such that the first set of bubbles rise from the first end of the container to a second end of the container, wherein the container contains the substance comprising a gellant solution with a cross-linker,
   sensing, a bubble sensor at the second end of the container, the first set of bubbles, and
   determining a calibration travel time based on an average travel time of the first set of bubbles,
   releasing, by the bubble generator, a second set of bubbles, into the first end of the container;
   determining, based on the second set of bubbles, an absence of a bubble released by the bubble generator at the bubble sensor within a predetermined time after having been released by the bubble generator; and
   determining a gelation time based on a total number of bubbles detected by the bubble sensor, wherein the gelation time is the time the gellant solution takes to gel such that a gaseous bubble is trapped within the substance.

2. The method according to claim 1, wherein the determined gelation time is based on the calibration travel time.

3. The method according to claim 1, wherein the determined gelation time is based on the predetermined interval.

4. The method according to claim 1, releasing, by the bubble generator at a first end of the container, the second set of bubbles comprises:
   heating the container, by a heater, to a predetermined temperature between 25 C and 100 C, wherein the substance is configured to cross link at least at the predetermined temperature.

5. The method according to claim 1, further comprising, sensing by a temperature sensor, a temperature of the substance in the container.

6. The method according to claim 1, wherein releasing, by a bubble generator at a first end of the container, the second set of bubbles comprises:
   releasing the second set of bubbles at predetermined intervals.

7. A system to determine a gelation time of a substance in a container, the system comprising:
   a container having a first end and a second end,
   a substance arranged in the container; wherein the substance comprises a gellant solution and a cross-linker and having a surface adjacent the second end,
   a bubble generator arranged at the first end of the container, wherein the bubble generator is configured to generate a first set of one or more bubbles and a second set of one or more bubbles at the first end of the container,
   a bubble sensor arranged at the second end of the container, wherein the bubble sensor is configured to sense the first and second sets of bubbles at the surface of the substance, and
   a computer sub-system operable to:
      determine a bubble calibration time based on an average travel time of the sensed first set of bubbles; and
      determine a gelation time of the substance based on the second set of bubbles, wherein the gelation time is the time the substance takes to gel such that a gaseous bubble is trapped within the substance.

8. The system according to claim 7, further comprising a temperature sensor.

9. The system according to claim 8, wherein the bubble sensor is arranged in the container.

10. The system according to claim 7, wherein the computer sub-system comprises:
one or more processors; and
a computer-readable medium storing instructions executable by the one or more processors to perform operations comprising:
prompting the bubble generator to release bubbles at predetermined intervals,
sensing, by the bubble sensor, the bubbles at the second end of the container, and
determining that a bubble released by the bubble generator has not been detected by the bubble sensor.

11. The system according to claim 10, wherein the operations further comprise calculating a gelation time based on a total number of bubbles in the second set of bubbles detected by the bubble sensor.

12. The system according to claim 7, wherein the bubble sensor is an ultrasonic scanner wherein the container is a tube.

13. The system according to claim 7, wherein the container is a hollow coil.

14. The system according to claim 7, further comprising a cover releasably attached to the second end of the container, wherein the bubble sensor is arranged in the cover.

15. A system to determine a gelation time of a substance in a container, the system comprising:
a bubble generator arranged at a first end of the container, wherein the bubble generator is configured to generate a first set of bubbles and a second set of bubbles at the first end of the container,
a bubble sensor arranged at a second end of the container, wherein the bubble sensor is configured to sense the first and second sets of bubbles at the second end of the container,
a gellant solution arranged in the container and having a cross-linker; and
a computer system comprising:
one or more processors; and
a computer-readable medium storing instructions executable by the one or more processors to perform operations comprising:
prompting the bubble generator to release the first set of bubbles;
determining a calibration time based on an average travel time of the sensed first set of bubbles;
prompting the bubble generator to release the second set of bubbles at predetermined intervals,
sensing, by the bubble sensor, the second set of bubbles at the second end of the container,
determining that a bubble of the second set of bubbles released by the bubble generator has not been detected by the bubble sensor, and
calculating a gelation time based on a total number of bubbles detected by the bubble sensor, wherein the gelation time is the time the gellant solution takes to gel such that a gaseous bubble is trapped within the gel.

16. The system according to claim 15, further comprising a heater configured to heat the container to a predetermined temperature between about 25 C to about 100 C.

17. The system according to claim 16, wherein the predetermined temperature is about 60° C.

18. The system according to claim 15, further comprising a cover attached to the container.

19. The system according to claim 18, wherein the bubble sensor is arranged in the cover.

20. The system according to claim 19, wherein the cover is a mesh cover.

21. The system according to claim 19, wherein the bubble sensor is a resistivity sensor.

22. A method to determine a gelation time of a substance in a container, the method comprising:
releasing, by a bubble generator, a first set of bubbles into a first end of the container such that the gas bubbles rise from the first end of the container to a second end of the container, wherein the container contains a gellant solution having a cross-linker;
sensing, by a bubble sensor, the first set of bubbles at the second end of the container;
determining a calibration travel time based on the sensed first set of bubbles;
releasing, by the bubble generator at the first end of the container, a second set of bubbles;
sensing, by the bubble sensor at the second end of the container, the released bubbles;
determining a travel time of each bubble of the second set of bubbles; and
determining a gelation time of the substance, wherein the gelation time is the time the gellant solution takes to gel such that a gaseous bubble is trapped within the substance and is based on the travel time of the second set of bubbles and a calibration travel time of the first set of bubbles.

23. The method according to claim 22, wherein the calibration time is an average travel time of the first set of bubbles.

24. The method according to claim 22, wherein the each bubble in the first set of bubbles is released at a predetermined interval.

25. The method according to claim 22, wherein the each bubble in the second set of bubbles is released at a predetermined interval.

26. The method according to claim 22, wherein, releasing, by the bubble generator at a first end of the container, a second set of bubbles includes:
heating the container, by a heater, to a predetermined temperature between 25 C and 100 C, wherein the gellant solution cross-links at least at the predetermined temperature.

27. The method according to claim 26, further comprising, sensing by a temperature sensor, a temperature of the substance in the container.

* * * * *